United States Patent Office 3,388,456
Patented June 18, 1968

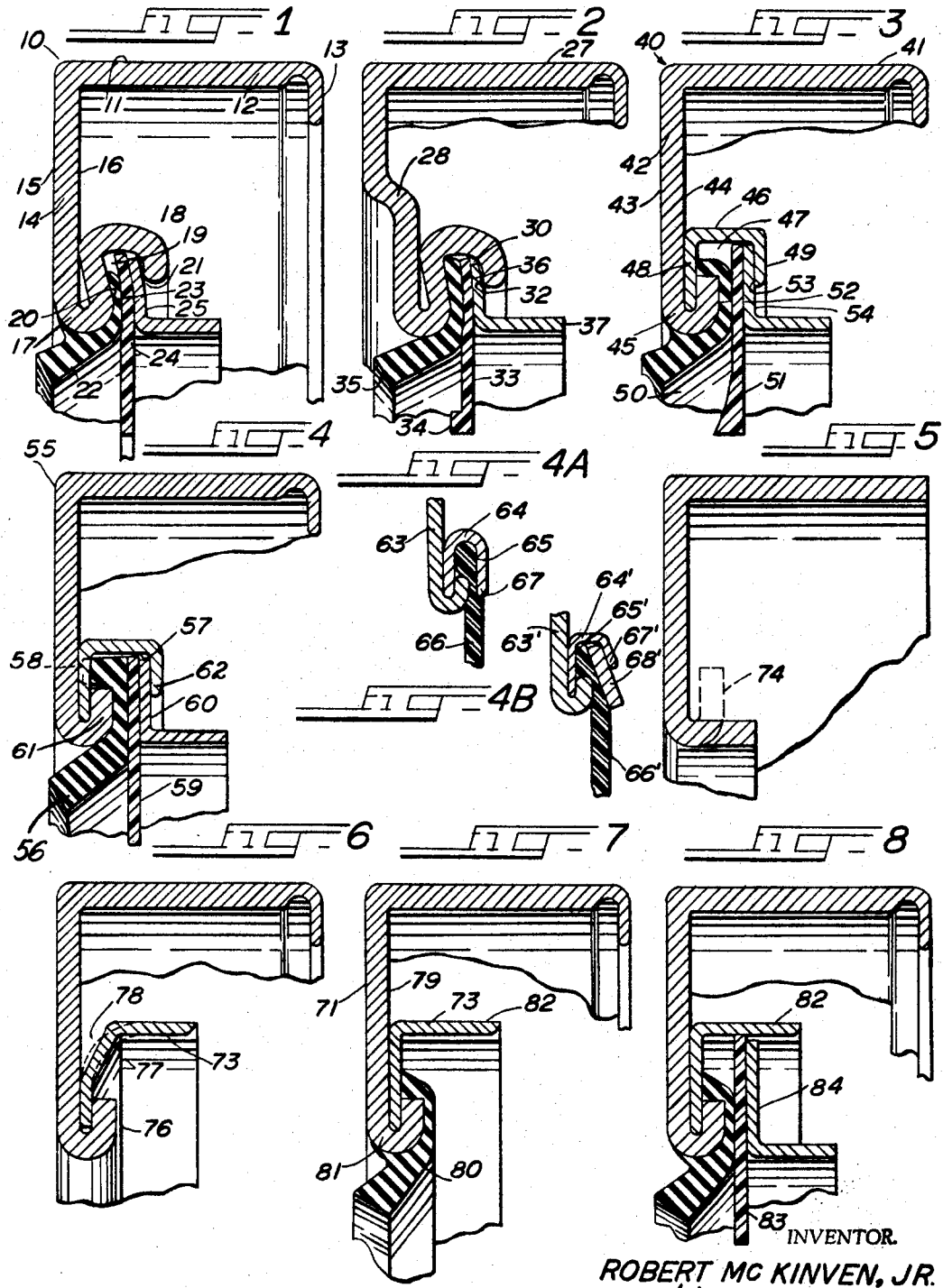

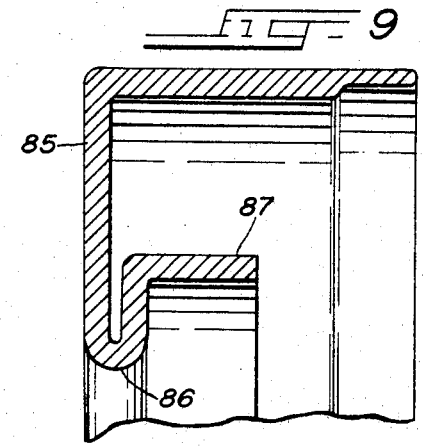
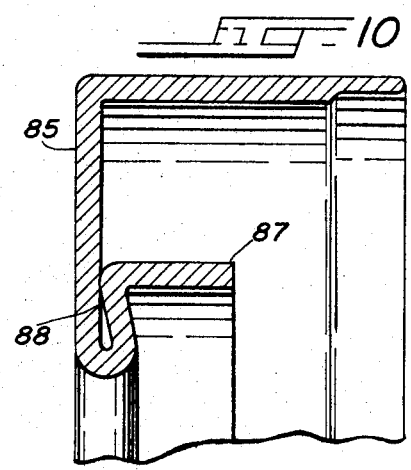
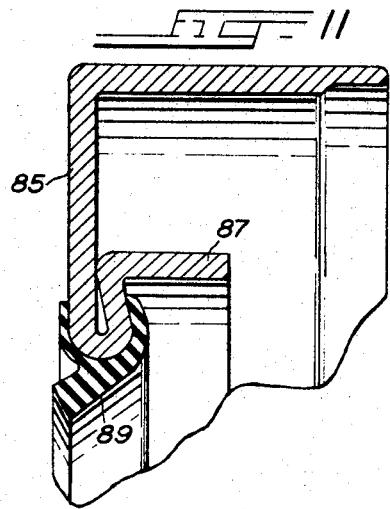
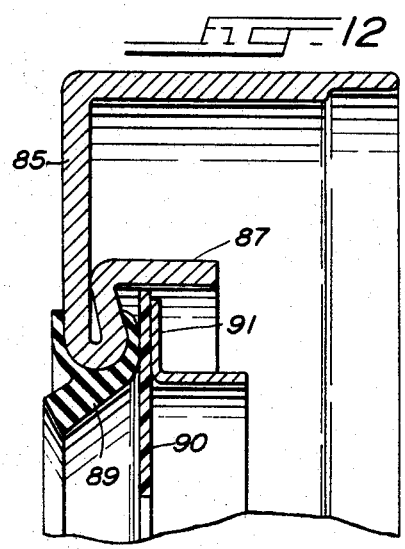
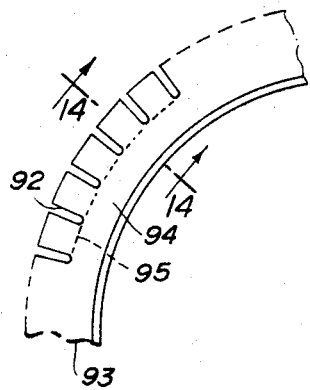
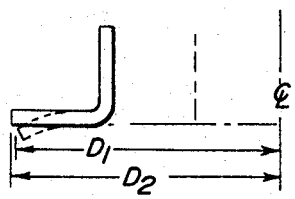
INVENTOR.
ROBERT MC KINVEN, JR.

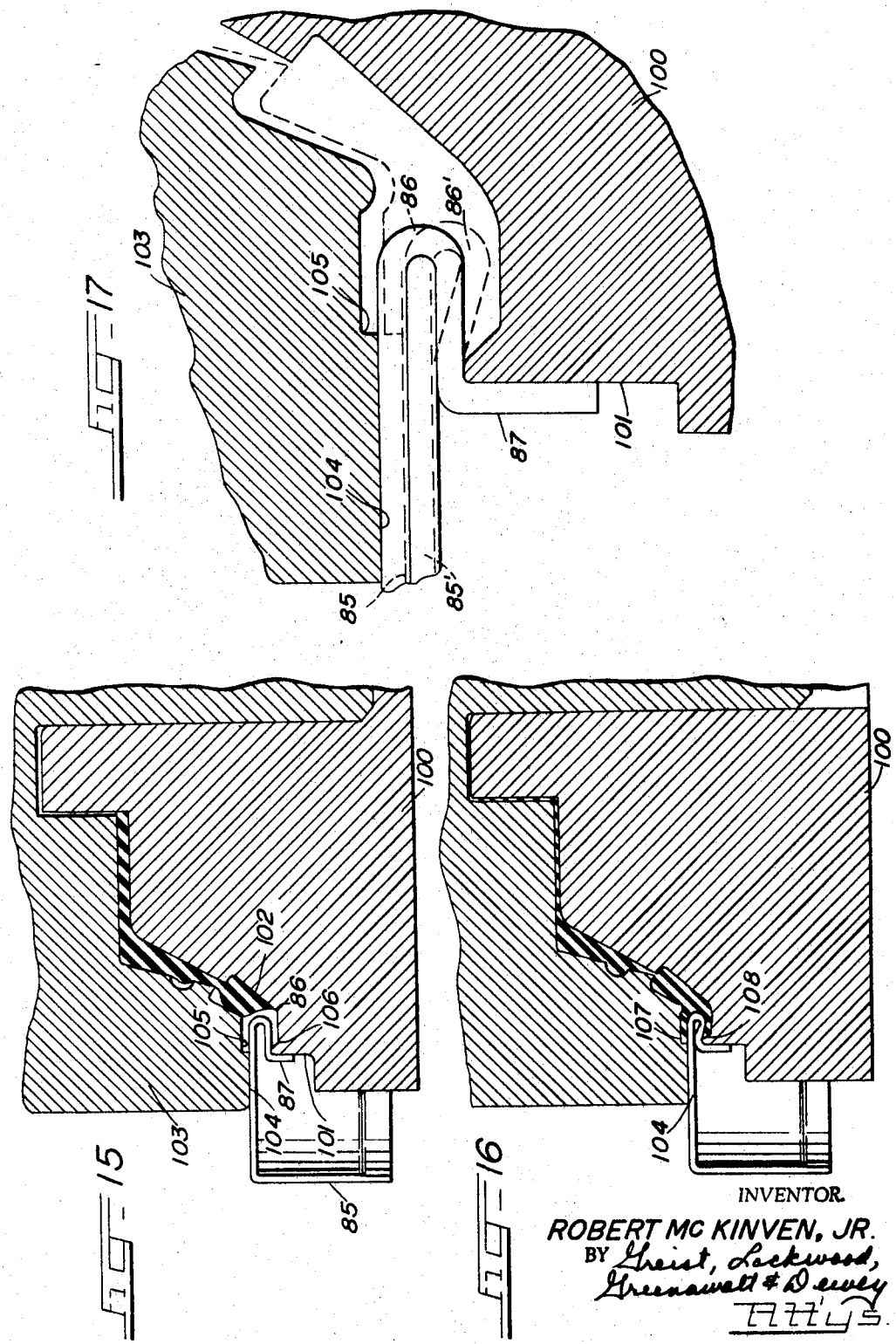

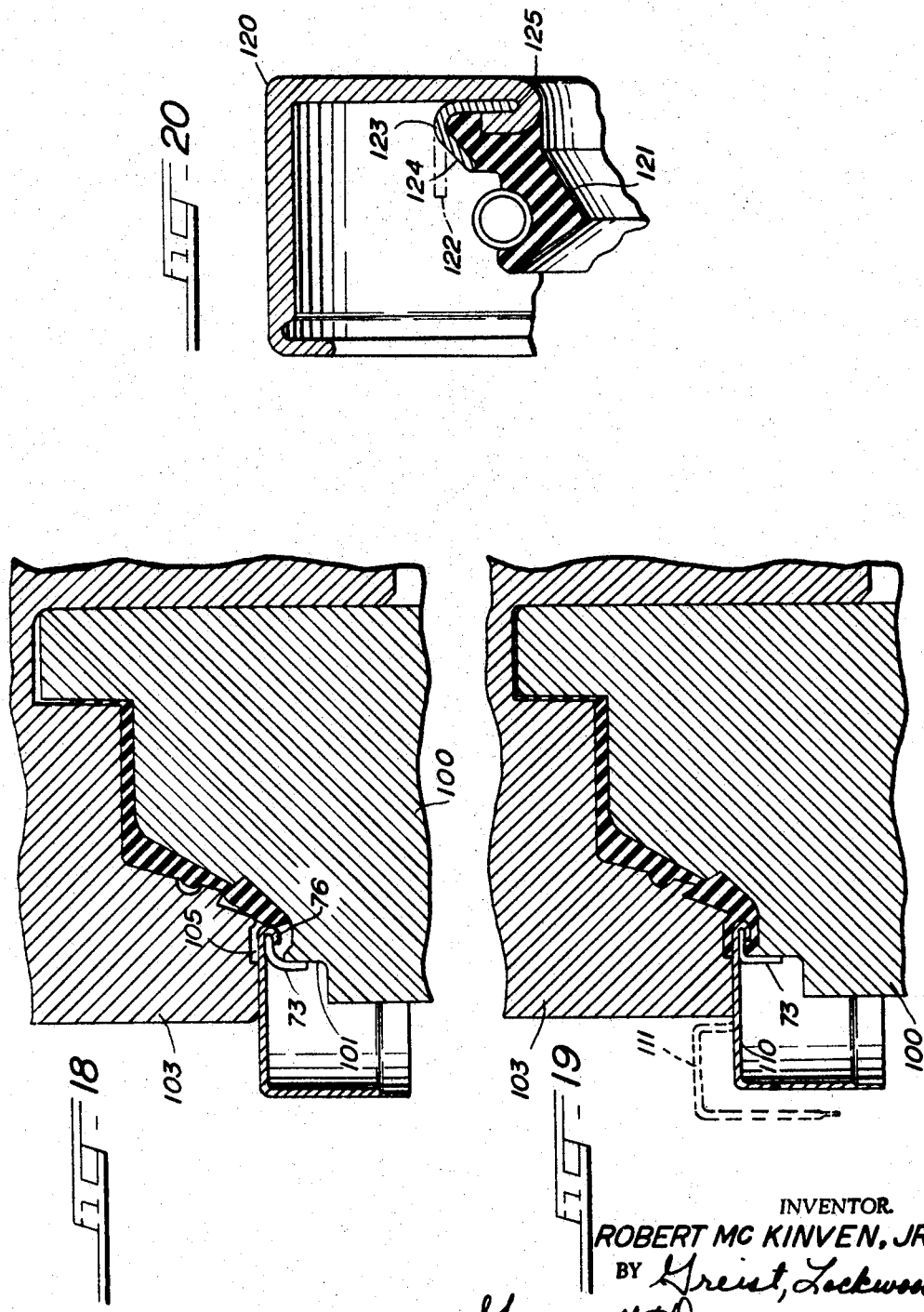

3,388,456
LIP SEALS
Robert McKinven, Jr., Detroit, Mich., assignor to Chicago Rawhide Manufacturing Co., Chicago, Ill., a corporation of Illinois
Application Jan. 8, 1964, Ser. No. 336,532, now Patent No. 3,276,783, dated Oct. 4, 1966, which is a continuation-in-part of application Ser. No. 178,390, Mar. 8, 1962. Divided and this application Mar. 8, 1966, Ser. No. 555,946
6 Claims. (Cl. 29—528)

This application is a division of Ser. No. 336,532, filed Jan. 8, 1964, now U.S. Patent No. 3,276,783, which was a continuation-in-part of my copending application, Ser. No. 178,390, filed Mar. 8, 1962, now U.S. Patent No. 3,250,541.

This invention relates to a new and improved shaft seal and an improved method of manufacturing the same. More specifically, the invention is directed to the solution of problems encountered in the internal gasketing of seals, especially those formed of fluorocarbon, and further to effectively provide a flexible manner of attaching a sealing element or elements formed from diverse or like materials to a relatively standardized casing in order to minimize the cost of manufacture while providing a wide range of seal types.

It is a principal object of this invention to provide a new and improved shaft seal.

It is a further object of this invention to provide an improved means for attaching a sealing element or elements to a casing in a fluidtight manner.

It is a further object of this invention to provide a novel pressure means to hold sealing elements of formed relatively stiff materials to a casing.

It is a further object of this invention to provide a multi-lip seal arrangement wherein the lip seal elements are supported for independent sealing action by a common casing.

It is a further object of this invention to provide a shaft seal with plural sealing lips of diverse materials wherein one sealing lip, although independent of the other, serves to provide an internal gasket for the other lip with both of the sealing lips being supported by a common casing.

It is a further object of this invention to provide a shaft seal embodying a casing supporting a flash free bonded lip structure as well as a fluorocarbon sealing element which is clampingly received in juxtaposition to the molded lip structure and gasketed thereby.

It is a further object of this invention to provide a novel pressure flange means which is uniquely clamped in a casing so as to establish a force couple which continuously exerts pressure on the sealing elements also clamped in the casing.

It is a further object of this invention to provide a new and improved method of manufacture of a shaft seal assembly including a method of flash free attachment of a sealing lip element to a peripheral portion of a casing.

Further and fuller objects will become readily apparent when reference is made to the accompanying drawings wherein:

FIG. 1 is an enlarged half sectional view of a seal employing a double lip structure;

FIG. 2 is an enlarged half sectional view illustrating a modification of the embodiment of FIG. 1;

FIG. 3 is an enlarged half sectional view of an embodiment similar to FIG. 1 utilizing a separate inner cup;

FIG. 4 is a view similar to FIG. 3 illustrating a duplicate lip structure with a clamped elastomeric packing;

FIG. 4A is a fragmentary half section similar to the construction of FIG. 3 with the omission of the molded lip structure and pressure flange;

FIG. 4B is a cross sectional view similar to FIG. 4A including a modified form of pressure flange;

FIG. 5 is an enlarged half sectional view of the outside casing of the embodiments of FIGS. 3 and 4;

FIG. 6 is a half section of the casing of FIG. 5 after assembly of the inner cup with a modified form of inner cup shown in dotted lines;

FIG. 7 is an enlarged half sectional view of the casing of FIG. 6 with the molded lip portion;

FIG. 8 is the device of FIG. 7 with the additional packing element and retainer flange added prior to clamping;

FIG. 9 is a half sectional view of the casing of the embodiment of FIG. 1 after forming;

FIG. 10 is a half section of the casing of FIG. 1 with the radially directed leg portion in contacting engagement with the radial face portion;

FIG. 11 is a view similar to FIG. 10 with a lip molded integral with the inner peripheral portion;

FIG. 12 is a view similar to FIG. 11 with a pressure flange and an additional sealing element in the assembled position prior to clamping;

FIG. 13 is a fragmentary elevational view of the pressure flange;

FIG. 14 is a cross sectional view of the pressure flange with dotted lines to show the configuration taken when assembled;

FIG. 15 is an enlarged half section of a mold with the mold halves in contact with a casing member such as that shown in FIG. 9;

FIG. 16 is the mold of FIG. 15 in the closed position;

FIG. 17 is an enlarged fragmentary view of the mold at the seal casing contacting portion with the casing shown in dotted lines prior to complete closing of the mold;

FIG. 18 is an enlarged half section of a mold with halves at initial contact with the casing of FIG. 6;

FIG. 19 illustrates the mold in the closed position with dotted lines to illustrate acceptance of a modified form of casing; and FIG. 20 is a half section of a modified form of seal utilizing the casing of FIG. 6.

The embodiment shown in FIG. 1 illustrates a sealing member 10 including a seal mounting member 11 having a cylindrical peripheral portion 12 terminated at one end in an abbreviated rolled over flange portion 13. In some environments the cylindrical peripheral portion would be omitted in lieu of other means to attach the seal member to a shaft or casing, however, for convenience the present application will be described in connection with the mounting member shown. At the opposite end of the cylindrical peripheral portion 12 a second flange portion 14 extends radially inwardly providing a pair of of axially facing radially extending face portions 15 and 16, and terminating at its inner periphery in a generally U-shaped portion 17. The U-shaped portion 17 extends radially outwardly and curls over smoothly as at 18 to define a seal element mounting groove 19. The seal element mounting groove 19 is provided with a relatively narrow mouth portion formed by an axially raised portion 20, and a generally radially extending leg portion 21.

A sealing element 22 is bonded to the base of the U-shaped portion 17 by a novel flashless method to be described hereinafter and has a portion extending upwardly across the axially raised portion 20 of the mouth ultimately terminating in the groove 19 thereby forming a thickened elastomeric portion 23 completely across the axially raised portion 20. A second sealing element 24 is also positioned within the groove in overlying juxtaposed relationship to the thickened portion 23 and is held thereto by means of a pressure flange 25 which extends through the mouth portion into the groove 19. The radially extending leg 21, defining one side of the mouth portion, is curled over at assembly applying axial force to an outer peripheral portion of the pressure flange 25 so as to continuously exert pressure thereon thereby clamping the sealing element 24 into fluidtight engagement with the thickened elastomer portion 23 covering the axially raised portion 20. The application of force to the outer peripheral portion of the pressure flange 25 in the manner noted above serves to distort it from a purely radial position since the axially raised portion 20, acting through the layer of elastomer at 23 and the sealing element 24, resists further axial movement of the inner peripheral portion of the pressure flange 25. Thus the pressure flange forces the sealing element 24 towards the raised portion 20 to form a fluidtight joint.

When the pressure flange 25 is examined in a free body diagram, one force, representing the clamping force, will be exerted axially against the outer peripheral portion in one direction while a resisting force, representing the force opposing axial movement of the inner peripheral portion of the pressure flange, will be exerted generally adjacent the inner peripheral portion in an opposite direction to the first force thereby establishing a force couple. As will be described hereinafter in greater detail, the use of a force couple provides substantial benefits in that continuous clamping pressure is exerted against the sealing element 24 urging it into compressing engagement with the elastomer covering the raised portion 20 to maintain a fluidtight gasket condition which is effective over a wide range of temperatures and pressures.

A modified form of seal is illustrated in FIG. 2, including a seal mounting member 26 having an axially extending portion 27 and a generally radially extending portion 28. The radially extending portion 28 is offset as at 29 to rigidify the radial portion 28, as well as recess the seal mounting groove 30 a slight amount for purposes to become apparent. The seal mounting groove is constructed in the manner of the arrangement of FIG. 1 having the mouth portion defined by an axially raised portion 31 and generally radially extending clamping leg portion 32.

A sealing element 33 having a thickened inner peripheral portion 34 is received in the groove 30, with a second sealing element 35 positioned adjacent the sealing element 33. Both sealing elements are clamped in fluidtight engagement between the mouth portions of the groove through interposition of a pressure flange 36 to establish a force couple relationship in the manner described in connection with FIG. 1. An axially extending annular portion 37 on the pressure flange 36 rigidifies the inner periphery to also resist bending when the leg portion 32 is rolled over to clamp the pressure flange and sealing elements into fluidtight engagement in the groove 30. The axially extending portion on the pressure flange also acts as a protector for the fluorocarbon lip during shipment and handling. Obviously, the axially extending portion of the flange 37 may be omitted in lieu of a heavier gauge of material being used for a pressure flange.

The sealing element 35 may be formed of a suitable elastomer capable of being deformed under pressure, thereby providing a resilient backing for the sealing element 33, as well as forming an exclusionary lip for sealing engagement with a shaft. During shipment and handling, the lip of the element 35 is protected at all times since it is positioned within the axial dimensions of the annular casing member. It is contemplated that the sealing element 34 will be pierced to provide an internal dimension smaller than the shaft of intended use, as is true with the embodiment of FIG. 1. Considerable kinetic energy at the sealing interface will be created when the thickened portion 34 of the sealing element 33 is expanded to fit over the shaft with excellent operational results obtained thereby. One particular advantage derived in connection with the standardized casings of FIGS. 1 and 2 is the absolute minimization of the amount of fluorocarbon material required, with the attendant reduction in manufacturing costs. This can be best appreciated by a consideration of the figures shown wherein the line of shaft contact occurs intermediate the terminal portion of the short exclusionary element and the inside diameter of the seal mounting member. Thus the differential diameters of the sealing element 24 or 33 can be minimized to conserve the amount of fluorocarbon used without affecting the excellence of the sealing action. The use of a narrow section of fluorocarbon also serves to reduce the influence of the great differential in thermal expansion coefficients between the fluorocarbon and metal elements.

A further advantage derived from the use of double lip constructions shown is that the exclusionary seal member will serve as a gasketing member for the fluorocarbon packing as well as a separate seal to prevent foreign material from entering the packing assembly. As illustrated in FIG. 1, the exclusionary sealing member is firmly bonded in a flashfree manner to the seal mounting member and extends a sufficient distance into the groove to provide a resilient backing for the fluorocarbon sealing element.

Referring now to FIG. 3, the seal 40, illustrated in section, has the usual cylindrical press fit portion 41 and radially extending portion 42 providing a pair of axially facing radial faces 43 and 44. The radially extending portion 42 is curled or rolled at its inner periphery into a U-shaped inner peripheral portion 45 to clampingly receive a second annular member or an inner cup 46 to define a seal mounting groove 47. The inner cup 46 is provided with generally radially extending leg portions 48 and 49 to form the sides of the groove 47. The leg portion 48 is received in abutting engagement with axially facing radial face 44 and is clamped thereto between the outwardly extending legs of the U-shaped peripheral portion 45. An exclusionary member 50 is bonded to the U-shaped portion 45 with a thickened portion extending upwardly into the groove and overlying the juncture or joint between the inner cup 46 and the terminus of the U-shaped flange 45. A fluorocarbon sealing element 51 overlies the thickened portion as it extends into the groove 47. The mouth portions of the groove are defined by the raised portion 52 and radially extending leg portion 53, and are offset radially, for purposes to become apparent. The thickened portion of the exclusionary member 50 in the region of the raised portion 52 provides an abutment surface for the sealing element 51.

A pressure flange 54, similar in construction to the one defined in connection with FIGS. 1 and 2, extends through the mouth portion into the groove 47 terminating short of the lower extremity thereof. When the radially extending leg portion 49 is curled over to engage the outer peripheral portion of the pressure flange 54, pressure is applied to the sealing element 51, forcing it axially against the thickened portion of the exclusionary member 50 to provide a fluidtight internal gasket. Exlusionary member 50 may be bonded to the seal mounting member by a novel flashless molding technique mentioned in connection with FIGS. 1 and 2 to be completely described in detail below. The sealing element 51 may take various forms, for example it may comprise an annular washer having a thickened inner peripheral portion, with the preferred forms having an inner diameter slightly less than the shaft of intended use.

A modified form of seal is shown in the view of FIG. 4 embodying a casing 55 formed in the shape of the casing of FIG. 3. The embodiment of FIG. 4 utilizes a separable exclusionary member 56 having an outer periphery received within the groove 57, which is constructed like the groove 47 of the embodiment of FIG. 3. In the free state, the outer periphery of the exclusionary sealing member 56 will take the form indicated in dotted lines at 58, and as clamping force is applied at assembly, the elastomer properties thereof permit the outer peripheral portion to assume the position shown in solid lines.

A thin fluorocarbon washer 59 is held within the groove in radial face to face abutting engagement with the exclusionary member 56 by means of a pressure flange 60. The clamping action exerted by the pressure flange 60 is of the same form as described in connection with FIGS. 1–3 in that a force couple is created by the opposite forces generated at the mouth of the mounting groove formed by the raised portion 61 and the radially extending leg portion 62. Substantial benefits are obtained through the use of the foregoing designs; in that the same casing can be used to mount seal members of different materials, hardness, etc., as well as permitting a choice of one or more lip designs up to the time of assembly. It is contemplated that environmental factors in the intended sealing application will ultimately dictate the range of available choices. In any event, the foregoing designs are extremely versatile, permitting the sealing lip types to be selected at assembly. Thus a manufacturer can make up a number of subassembly blanks and delay assembly until such time a customer orders a particular type of seal member. Obviously, with the built-in versatility inventories can be substantially diminished.

The embodiment of FIGS. 3 and 4 represents a modification of the constructional concepts illustrated in FIGS. 1 and 2. While the embodiments of FIGS. 1 and 2 are quite satisfactory in certain applications, the embodiment of FIGS. 3 and 4 provide an added advantage in the form of a minimization of metal strain, adapting them for use with a wider range of shaft and bore sizes. Moreover, the two piece construction allows selection of diverse thicknesses of metals for the outer casing and inner cup which presents additional advantages. In applications in which the radially extending flange is of great diameter, a thickened inner cup may be used to lend rigidity thereto to insure perfect concentricity in operation. Still further, in the embodiment shown, the use of a pressure flange results in two key operational features which are: (1) a neck contact point for rigidity and flatness with (2) a flexible action external from the gasket points which provide a sustained loading on the packing(s). The importance of this cannot be overstressed since an oil seal, in order to be effective, must seal perfectly at two areas if it is assumed that the seal mounting member is received in the cooperating bore in a fluidtight manner. The lip contacting portion with the rotating or reciprocating shaft must provide one sealing point, while the other must be at the area of engagement of the seal element and its mounting member. The latter has been alluded to above as the gasket area since the sealing element acts as a gasket at this point.

A further benefit derived from the use of the two piece seal mounting member resides in allowing the outer shell thickness to be increased to the point adequate for rigidity without increasing the possibility of cracking at the bending region. In this instance the inner cup may be made very thin to minimize and control bending stresses when the fluorocarbon element is clamped therein. In one concrete embodiment the seal mounting member had an inner cup thickness of ten thousandths of an inch whereas the outer portion was thirty thousandths of an inch in thickness, thus illustrating the flexibility of the design.

The embodiments of FIGS. 4A and 4B further demonstrate the flexibility of the seal mounting member described above. It is to be understood that the outer periphery of the casing can be of any desired form, for example it may be provided with an axially extending flange portion terminating in a radially inwardly turned radial flange such as shown in the embodiments of FIGS. 1–4.

In the fragmentary portion illustrated in FIG. 4A the seal mounting member 63 mounts an inner cup member 64 in a manner which will be specifically described hereinafter. The inner cup defines a groove 65 receiving the outer peripheral portion of a fluorocarbon sealing element 66. The assembly as illustrated requires a minimum number of elements, these being the seal mounting member 63 having a short extruded neck carrying a light gauge inner cup or stamping 64 with the height thereof being accurately controlled, and a flat fluorocarbon washer. The spacing on the U-shaped portion receiving the inner cup member 64, permits the neck of the seal element mounting member 63 to curl on a sufficiently large radius in order to eliminate the danger of cracking at the inside diameter thereof during the forming thereof.

When the inner cup 64 is curled over in the manner shown to engage the seal element 66, a controlled bend point on each side of the seal element is established. The bend point on the outside is controlled by the die rolling over the inner cup 64 while the inside bend point is controlled because the inner stamping is made to accurately controlled dimension. A generous radius is provided on the inner end 67 of the inner cup 64 which discourages any tendency for the sharp edge of the inner stamping to cut into the fluorocarbon at the bend point. A reservoir of inverted tear drop cross section is developed inside the inner cup to provide ample volume for internal extrusion of the displaced material resulting from the clinching action. The particular importance of this is clearly pointed out in the copending application alluded to hereinbefore.

FIG. 4B illustrates a construction similar to that of FIG. 4A, however a flat pressure washer is included. As pointed out with respect to FIG. 4A the manner of forming the subassembly will be described completely hereinafter. The basic elements of the construction of FIG. 4B include the seal element mounting member 63′ (shown fragmentarily), inner cup member 64′ forming a groove 65′ which receives a sealing element 66′. A flat pressure washer 68′ is clamped by the inner cup 64′ in radial engagement with the sealing element 66′. The pressure washer 68′ is formed of light gauge material and made of a higher hardness of steel than is normally used in the seal stampings forming the seal element mounting member for good clamping action. The inner cup member has a wall portion 67′ which is slightly shorter than the design shown in FIG. 4A.

In the illustrated assembly, the open end of the stamping is curled over the outer edge of pressure washer. This action causes the pressure washer to deform a slight amount as shown, establishing the tendency for the pressure washer to return to its original flat state. This results in a pressure on the fluorocarbon packing in the area of the curled inner periphery of the seal mounting member 63′ to provide for excellent internal gasket action.

FIGS. 5–8 illustrate the step-by-step method of manufacturing the seal of FIGS. 3 and 4 which also adds to the uniqueness thereof. The seal element mounting member takes the form of a generally L-shaped section 71 having an axially extending inner peripheral portion 72. As seen in FIG. 6 an inner cup 73 is positioned within the axial portion 72 which is curled over to form a U-shaped peripheral portion shown in solid lines at 76 in FIG. 6 (dotted lines 74, FIG. 5). The dotted lines 77 on the inner cup 73 illustrate a modified shape which the inner cup may take without impairing the quality of the finished product. A clearance 78 is provided between the radially extending portion of the inner cup 73 and the outer casing 71 for purposes to become apparent.

In FIG. 7 the inner cup has been deformed into flat engagement with a radially extending wall portion 79 on the outer casing 71, such deformation occurring during the molding of lip 80 on the U-shaped peripheral portion 81. At this stage of manufacture, the inner cup 73 has an axially extending flange portion 82, which permits insertion of a fluorocarbon packing 83 of the desired shape and size along with an annular pressure flange 84. The axially extending flange 82 is then rolled over to clamp the seal element and pressure flange as shown in the completed assembly of FIG. 3. If the seal of FIG. 4 is to be manufactured, the inner cup is formed as shown in FIG. 7 with the molded lip 80 omitted. In order to fabricate the design illustrated in FIG. 4, the packings are stacked in the manner illustrated in FIG. 8, and the flange 82 is curled over to clamp the elements fluidtightly together in a single manufacturing step.

FIGS. 9–12 are graphic representations of the various configurations that the seal mounting member may take for various forms of seal elements. The seal mounting member is of standardized construction to hold single lip constructions, and double lip designs having either molded or separate lips, in combination with a thin fluorocarbon sealing element of desired dimensions. In FIG. 9 the casing 85 has been formed to a generally L-shaped configuration like the embodiment of FIG. 5, having a U-shaped internal peripheral portion 86 which curls rearwardly towards the outer peripheral portion of the seal element mounting member terminating in an axially extending flange 87. If it is desirable to utilize a single sealing element such as shown in my copending application, Ser. No. 178,390 filed Mar. 8, 1962 or a single sealing lip construction in combination with a clamped exclusionary member such as shown in FIG. 2, the seal mounting member will be further processed to include bending the leg portions of the U-shaped portion into mutual engagement as at 88. The seal element(s) may then be positioned and clamped by rolling over the flange 87 to the final position shown in FIG. 2.

Assuming it is desirable to manufacture a seal having a molded exclusion member, the seal mounting member 85 of FIG. 9 is placed in a mold as will be hereinafter described more fully, and the lip 89 shown in FIG. 11 is molded as shown, with the bending step being performed in the molding process. A thin sealing element 90 may be positioned as shown in FIG. 12 along with a pressure flange member 91 within the annulus defined by the axially extending flange portion 87. A suitable fixture holds the seal mounting member while the flange 87 is rolled over to assume the configuration shown in FIG. 1, completing the seal assembly.

The various forms of seal mounting member constructions shown in FIGS. 5–12 lend economy to the manufacture of a wide range of versatile seals, with each insuring that the internally gasketed portion will remain fluidtight over a wide range of temperatures and pressures. The internal gasketing of the sealing element is achieved through the use of the novel groove construction employing a wider base portion than the mouth portion, allowing ample volume for any material extruded or displaced due to the clamping action at the mouth portion. The clamping action is continuously exerted, which is particularly important in materials which are susceptible to compression set, cold flow or include thermoplastic characteristics which would tend to reduce the gasket pressure resulting from the build-up of kinetic energy at the time of clamping.

More particularly, in the fluorocarbon sealing elements which are necessarily very thin, the margin between sufficient compression to provide a fluidtight internal gasket and that to shear the fluorocarbon packing is quite narrow when compared with the more common sealing materials. Thus, it is essential that the clamping pressure applied to the sealing components must be accurately controlled and the assembly set-up must be held to most exacting tolerances if the internal gasketing action is dependent on the kinetic energy in the compressed fluorocarbon sealing element. The use of a pressure flange which is loaded around the outer peripheral portion by the clamping action serves to provide a constant force at its internal periphery defining a bend point in the fluorocarbon sealing element, as well as providing constant pressure to insure a fluidtight internal gasket. In the double lip designs, the exclusionary member is positioned so as to overlie a raised portion of the mouth to provide a resilient backup member co-operating with the pressure flange to maintain fluidtightness under the most adverse conditions without impairing the flexing action of the sealing elements held thereby. Obviously, this function could also be achieved by a resilient backup washer or coating which does not perform a sealing function.

As pointed out above, the outer periphery of the pressure flange is lesser in diameter than the base portion of the groove of the co-operating seal mounting member. When the outer peripheral portion of the pressure flange is deflected under the clamping force, it causes a further reduction in the outside diameter, causing the radially extending portion thereof to take a generally spherical shape serving to reduce the force transmitted to the sealing element. While in some instances this may be desirable in order to lend rigidity to the pressure flange, in other cases it is undesirable due to the reduction in available clamping force.

The undesirable aspects were overcome in a manner shown in FIG. 13 wherein a series of radially extending notches 92 were provided in the foot or radially extending portion 83 of the pressure flange 94. The notches were closely spaced so that on clamping, deflection took place on a series of straight lines (indicated in dotted lines at 95) between the notches minimizing any tendency for the foot portion 93 to take a rigid spherical shape.

This may be more clearly observed in FIG. 14 which shows the pressure flange in solid lines in the free state, and in dotted lines 96 in the clamped state, with the overall reduction in diameter represented by the differential between D1 and D2. While a heavier gauge flat washer may be substituted for the generally L-shaped design of the pressure flange, it has been desirable to make it of the shown configuration since under general techniques the stamped out inner portion would in most instances be scrap. Obviously, a thinner gauge of metal may be use for the pressure flange when it is formed in the L-shaped configuration shown with the attendant saving of material and reduction in manufacturing costs.

The manner in which the exclusionary element is molded in a flash free manner to the unified casing will now be explained with reference to FIGS. 15 and 16. The seal mounting member 85 of FIG. 9 is positioned in the lower half of a mold 100 with the axially extending flange portion in abutting engagement with a cylindrical surface 101, and the U-shaped peripheral portion 86 extending into the mold cavity 102. The upper half of the mold 103 is provided with a seal mounting member surface engaging portion 104 which has a cavity 105 terminating substantially in opposition to a circular line on the other leg of the U-shaped member indicated at 106. As illustrated in FIG. 15, the mold is in the initial contact position with the surface 104 in abutting engagement with the radially extending flange portion of the cup. The lower mold half centers the cup by the cylindrical surface 101 being in circumferential engagement with the inner peripheral portion of the flange 87, to provide concentricity of the stamping in relationship to the center line of the mold. The prepared elastomeric material is loaded in the central region of the mold cavity when the mold is entirely open. As the mold closes, the material is extruded outwardly in the mold cavity 102 partially filling the cavity when the mold initially contacts the seal mounting member 85. Continuous axial travel of the mold after initial contact with the seal mounting member serves to completely fill the mold cavity with a building up of sufficient internal pressure to form a mechanically rigid fluidtight bond. That is achieved by literally filling the mold cavity before axial movement of the mold is completed. Inasmuch as the elastomers are relatively incompressible, the final increment of mold travel requires some extrusion of material out of the mold cavity through provision of suitable relief grooves.

It is essential, in order to have a flash free finished product, that the contact pressure at the junction of the mold and seal mounting member on opposite sides thereof be of sufficient magnitude to act as a barrier to the elastomer flow, bearing in mind that considerable pressure is generated when the volume of the mold cavity is reduced to minimum. This becomes more apparent on examination of FIG. 16 which shows the mold at the closed position. Contact pressure is generated across the surface 104 terminating in a circular line 107 on the outer face of the seal mounting member, and over a generally point-like surface 108 on the inner side of the seal mounting member. The axial travel of the mold causes the leg portions of the U-shaped internal peripheral portion to merge together forming the axial raised mouth portion described above.

A great appreciation of this coaction will be had by examination of the enlarged view in FIG. 17. The solid lines illustrate a fragmentary portion of the casing 85, with the mold in the position described in connection with FIG. 15, while the dotted lines indicated by prime numerals indicate the final position of the seal mounting member when the mold has completed its travel. The enlarged view showns the point-like contact at 106 to define a sharp cutoff to avoid any flash whatsoever. It is to be appreciated that as the mold travels from the initial contact position to closed position, the stamping is reformed by the mold. The resisting force of the stamping to the reforming action generates sufficient pressure against the mold halves along the areas noted to insure a flash free finished product. Since the force which reforms the seal mounting member acts essentially in an axial alignment with the reacting force, there is no danger of distortion of the outer peripheral portion of the seal mounting member, and stretching of the metal is maintained at a minimum. It is obvious that the cutoff lines may be varied slightly without adverse effect so long as the resisting force of the mounting member is sufficient to maintain mold engagement in opposition to the elastomer pressure.

The seal mounting member defined in connection with FIG. 6, is shown in FIG. 18 as being positioned in a mold of identical construction to the mold of FIG. 13. The seal mounting member is illustrated with the inner cup 73 taking the arcuate form illustrated in dotted lines at 77 in FIG. 6. However it may take the form shown in solid lines also without effecting the quality of the finished product. The inner cup 73 is provided with an axially extending portion for engagement with a circumferential surface 101 of the lower mold 100.

In the position of initial contact shown, the upper mold half 103 contacts the radially extending face on the seal mounting member over a fairly broad area terminating in a circle 105. The U-shaped inner peripheral portion 76 is positioned concentrically within the mold cavity with the terminal point being well within the cavity and concentric thereto, due to the snug relationship between the flange 73 and the lower mold 101.

As the mold halves 100 and 103 move to the closed position, the inner cup 73 is reformed to provide an annulus substantially L-shaped in cross section. The contact pressure between the subassembly of the seal mounting member before reformation and the mold is derived from the force required to reform the inner cup 73. The reformation takes place in the mold to the degree that the inner cup surface impinges against the radial face 110 of the seal mounting member. Mold material flows around the U-shaped peripheral portion and over the junction with the inner cup 73 forming an additional seal as well as firmly adhering to the stepped surface of the joint.

It is evident that the outer diameter of the seal mounting member will vary over a wide range to fit machine housing bores of various diameters. The molds shown will accommodate various shapes and sizes limited only by the internal diameter. For example, the seal may be formed as illustrated in dotted lines at 111 with a necked radial flange portion to protect the molded lip during later handling and shipment. Also it is possible to use the necked flange 111 as a centering means during molding if desired. The molding technique described is not limited to the single lip construction shown, and additional lips may be formed by providing an additional cavity in the mold. In all cases the charge of mold material is reduced considerably to insure minimizing of manufacturing costs.

The seal shown in section in FIG. 20 comprises a seal mounting member 120 and a sealing element 121. The seal mounting member 120 is of the form of the embodiment of FIG. 6 prior to molding the sealing element 121 thereon, with the original configuration being represented by dotted lines 122. After the sealing element 121 has been molded thereto, the axial flange 122 on the inner cup 123 assumes the configuration shown at 124 with the reformation occurring in the molding process.

The inner peripheral portion 125 of the seal mounting member 120 is engaged by one of the mold halves to insure proper centering and with sufficient pressure to insure a clean cutoff line in accordance with the flashless molding procedure described above. The axially extending flange portion 122 of the inner cup 123 is reformed to the position shown at 124 by the coacting mold half to provide a clean, sharp, flash free cutoff between the mold material of the lip portion and the seal mounting member.

The modification of FIG. 20 is exemplary of the wide variations of uses of the seal mounting member subassembly shown at FIG. 6. The inner cup 123 may be diverse thickness with respect to the remaining portion of the seal mounting member 120 for reasons previously noted.

A feature which is exceedingly important in each of the foregoing designs, is that each is conductive to universal molding without requiring the inner peripheral region of the seal mounting member to be bent at an angle during the molding process as in known techniques. Bending of this magnitude is objectionable since it causes distortion of the outer periphery of the seal mounting member, ultimately resulting in an imperfect seal when the finished assembly is mounted in the bore of a machine housing or the like. Further, the thickness of metal in each of the present designs lends itself to sturdy seals, even though the gauge of the material practically speaking, is very light and the costs thereof maintained at a minimum. In addition, the novel seal mounting member utilizes a relatively standardized stamping for a subasssembly which forms the basis for a wide range of diverse seal types, which may ultimately be selected or chosen at the time of assembly. Thus, the requirement to have huge inventories is obviated and orders for a particular type of seal can be fulfilled by completion of the finished product through performing a single assembly step.

It is not intended that the illustrated embodiments and language employed in describing the same be limiting, inasmuch as such was done in the interest of brevity and clarity of description. It will become immediately obvious to those skilled in the art, that certain modifications and variations of the invention may be made without departing from the spirit and scope thereof, and therefore only such limitations should be imposed as are indicated in the appended claims.

I claim:

1. The method of forming a seal comprising the steps of forming a metal annulus which is generally L-shaped in section having an axially extending abbreviated flange, curling said flange in a radially outward direction so as to be substantially parallel to one leg of said L-shaped section, and further curling said flange in an axial direction thereby defining a seal mounting flange, inserting said annulus in a charged two part mold having a seal forming cavity therein, positioning the axially extending portion of said seal mounting flange in snug circumferential engagement with one part of said mold, thereby placing the curled portion within the mold cavity, closing said mold parts to engage said L-shaped annulus on one side and said portion of said seal mounting flange on the other to deform a portion of said seal mounting flange towards one leg of said L-shaped annulus while simultaneously molding a sealing lip about said seal mounting flange.

2. The method of claim 1 including the steps of removing said annulus from said mold, inserting a second sealing element within the axially, extending portion of said seal mounting flange, positioning metal annulus over said second sealing element and curling said axial flange over to form a groove to hold said second sealing element and said metal annulus in abutting fluidtight engagement.

3. The method of forming a seal comprising the steps of forming an annular metal seal mounting member having a radially extending face portion and an axially extending portion, providing an annular inner cup capable of being inserted into said member and having an axial flange portion joined to a radial flange portion, positioning said inner cup with a portion of the radial flange portion abutting said radially extending face portions in the region of said axially extending portion, curling said axially extending portion over said radial flange on said inner cup to maintain said radial flange and said radial portions in engagement, inserting said seal mounting member in a charged, seal-forming, two-part mold, positioning said axial flange in snug engagement with a peripheral portion on said mold with the radial flange of said inner cup extending within the mold, closing said mold to engage said radial face portion with one part and said radial flange with the other part, continuing the closing of said mold to bring substantially all of said radial flange on said inner cup into abutting engagement with said radial face portion while simultaneously molding a sealing element thereto.

4. The method of claim 3 further including the steps of removing said seal mounting member and molded sealing element from said mold, inserting a second flat washer-like sealing element within the confines of said axial flange on said inner cup, placing a pressure flange over said second sealing element and curling said axial flange in a radial and axial direction to clamp said pressure flange and sealing element within a groove formed thereby.

5. A method of molding and attaching an elastomeric sealing element to an annular rigid metallic seal mounting member having a generally radial portion with a U-shaped peripheral portion to provide a pair of oppositely directed generally radially extending surfaces, said elastomer being attached to said seal mounting member in a flash free manner, which method comprises applying pressure in one direction against one of said surfaces of said seal mounting member adjacent the U-shaped peripheral portion over an area terminating in a circular line radially spaced from the base of said U, applying pressure to the other face in a generally axial direction in a circular line adjacent said U-shaped peripheral portion, applying elastomeric material to both of said surfaces of said seal mounting member, said elastomer extending from one of said circular lines to the other of said circular lines so as to bond said elastomer about the base portion of said U-shaped peripheral portion, said elastomer terminating at said lines in a flash free manner.

6. The method of claim 5 including the step of deforming one upstanding portion on said U-shaped portion towards the other upstanding portion immediately prior to the application of elastomer to said U-shaped portion.

References Cited
UNITED STATES PATENTS

| | | | |
|---|---|---|---|
| 3,090,996 | 5/1963 | Reishenbach et al. | 29—527 |
| 3,122,116 | 2/1964 | Hagmann et al. | 29—528 X |
| 3,276,114 | 10/1966 | Blaurock | 29—527 |
| 3,276,115 | 10/1966 | Hansz | 29—527 |
| 3,352,566 | 11/1967 | Kennedy | 29—527 X |

JOHN F. CAMPBELL, *Primary Examiner.*

PAUL M. COHEN, *Assistant Examiner.*